United States Patent [19]

Alberts

[11] Patent Number: 4,721,449

[45] Date of Patent: Jan. 26, 1988

[54] ICE CREAM SCOOP

[76] Inventor: Scott Alberts, 3074 N. Lima St., Burbank, Calif. 91504

[21] Appl. No.: 18,423

[22] Filed: Feb. 25, 1987

[51] Int. Cl.$^4$ .............................................. B29C 33/44
[52] U.S. Cl. .................................... 425/187; 425/286
[58] Field of Search ............... 425/286, 282, 276, 182, 425/187

[56] References Cited

U.S. PATENT DOCUMENTS 1,642,726  9/1927  Gardner ............................... 425/286
2,756,698  7/1956  Eichin et al. ......................... 425/286

*Primary Examiner*—Willard Hoag
*Attorney, Agent, or Firm*—James E. Brunton

[57] ABSTRACT

An improved ice cream scoop for scooping ice cream from bulk containers of the character having a spring biased ejection mechanism for ejecting the ice cream from the scoop in which, upon a failure of the ejection mechanism, a new mechanism can be easily and quickly installed without the use of tools and without the need for removal of fasteners of any kind.

7 Claims, 3 Drawing Figures

ICE CREAM SCOOP

BACKGROUND OF THE INVENTION

1. Field of the Invention

The present invention relates generally to a device for scooping ice cream from a bulk ice cream container. More particularly the invention concerns an improved ice cream scoop for use in the home or in ice cream parlors of the character having a spring biased ejection piston carried within the hollow scoop portion of the device for ejecting ice cream into a dish or onto an ice cream cone.

2. Discussion of the Prior Art

Typically ice cream is served in ice cream parlors in dishes, cups or on cake cones. The ice cream is generally removed from bulk containers such as five gallon cardboard containers which are stored in top opening refrigerated cases. The ice cream is scooped from the containers by means of some type of an ice cream scooping device. Most such devices have a generally hemispherically shaped hollow scoop portion connected to an elongated handle. Frequently, the scooping devices used in large volume ice cream dispensing retail outlets also include a spring biased piston-like mechanism which assists in ejecting the ice cream from the scoop onto a cone or into a cup.

As a general rule, when an the ejection mechanism is used in the prior art devices it comprises a flat spring member having one end permanently connected to the handle of the device by means of a fastener such as a rivet or bolt and the other end connected to the top of a piston-like body which is telescopically movable within a central aperture formed in the top wall of the scoop. The flat spring member also typically includes an angularly upwardly extending central portion which biases the piston into an upward position wherein a circumferentially extending flange formed around the bottom of the piston engages the inner surface of the scoop. By pressing down on the central portion of the spring member, the piston is urged downwardly against the resistance of the spring to eject the ice cream. Upon removing the downward pressure on the flat spring member, the piston will move upwardly within the aperture to an at rest position which does not interfere with the internal contour of the scoop.

One of the major drawbacks of the prior art scooping devices of the character described in the preceding paragraph resides in the fact that while the handle and scoop are virtually indestructable, the spring member of the device fails frequently due to corrosion and metal fatigue. Because the spring member is rigidly connected at one end to the handle usually by a nonremovable fastener, when the spring breaks, the entire device must be discarded and a new device purchased. Even if the fastener takes the form of a metal screw, its removal is frequently impossible due to the continued exposure of the device to water which severely corrodes the screw. In the case of large volume retail dispensing of ice cream, the cost of continually discarding the mechanized scoops can become substantial.

The aforementioned drawbacks of the prior art devices is uniquely overcome by the device of the present invention wherein the spring member is removably secured in a position within a channel formed in the handle without the use of fasteners of any kind. Accordingly, when the spring member fails, the broken end thereof can be readily removed from the handle and a new spring assemblage installed without the use of tools or fasteners of any kind. By replacing the relatively inexpensive spring mechanism, the basic tool can be continued to be used virtually forever.

SUMMARY OF THE INVENTION

It is an object of the present invention to provide an improved ice cream scoop of the character having a spring biased ejection mechanism in which, upon a failure of the ejection mechanism, a new mechanism can be easily and quickly installed without the use of tools and without the need for removal of fasteners of any kind.

It is another object of the invention to provide a device of the character described in which the ejection mechanism functions to break the vacuum tending to hold the ice cream within the scoop and can be quickly and easily removed and reinstalled to enable thorough cleaning of the device.

It is a further object of the invention to provide a device of the aforementioned character in which the ejection mechanism is maintained in position within a channel formed in the handle of the device by means of the spring action of the leaf spring which provides the biasing action to the ejection piston of the mechanism.

DESCRIPTION OF THE INVENTION

Figure 1:
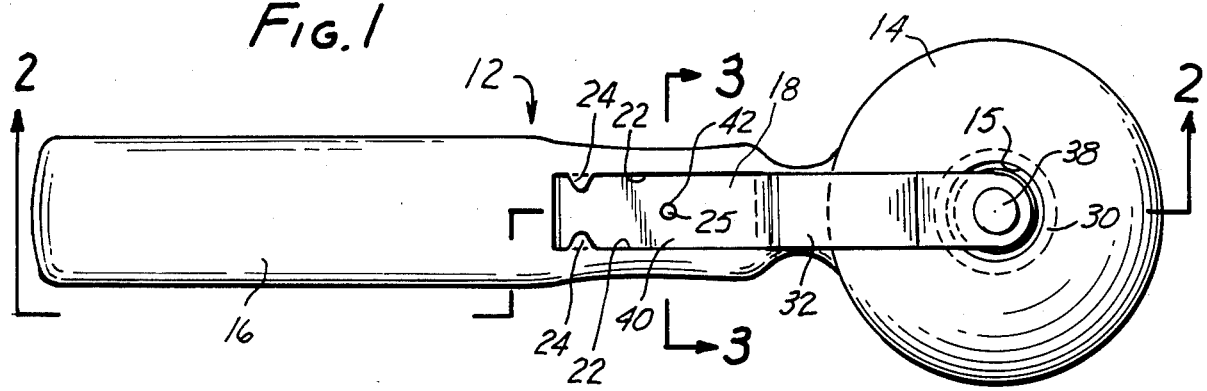
FIG. 1 is a top view of the improved ice cream scoop of the present invention.
Figure 2:
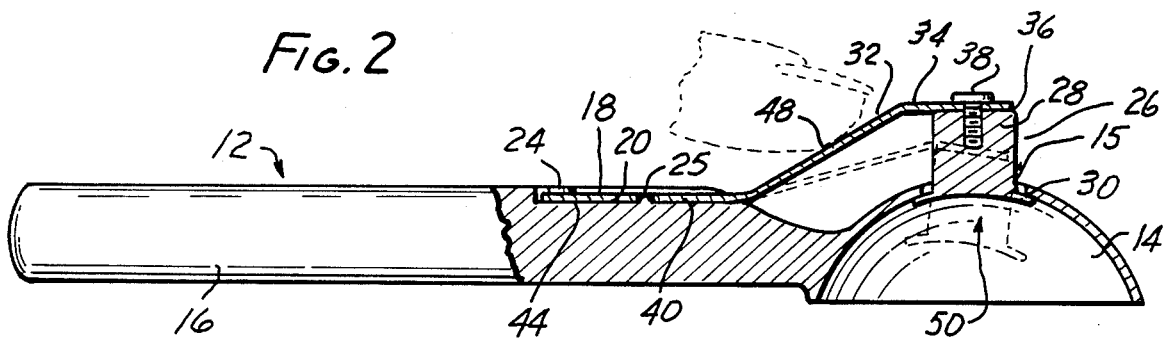
FIG. 2 is a view partly in cross-section taken along lines 2—2 of FIG. 1.

Referring to the drawings and particularly to FIGS. 1 and 2, the improved ice cream scoop of the present invention is there generally designated by the numeral 12. The ice cream scoop comprises a generally hemispherically shaped hollow scoop 14 having a centrally disposed aperture 15 formed in the top wall portion thereof. An elongated handle 16 is connected with the scoop 14 and is provided with an elongated, longitudinally extending channel 18 having a base wall 20 and transversely spaced upstanding side walls 22. Extending inwardly from the side walls 22 are transversely spaced apart locking members 24 which are generally triangularly shaped in plan. These locking members 24 form an important aspect of the present invention and, as best seen by referring to FIG. 2, are generally planar in shape and are spaced apart a predetermined distance from the bottom wall 20 of the elongated groove or channel 18. Centrally disposed within channel 18 and upstanding from the base wall 20 is a dimple-like protuberance 24, the purpose of which will presently be described.

To assist in the ejection of ice cream contained within the hollow interior of the scoop 14 is an ejection means which is removably connected to the handle 16. In the present form of the invention, the injection means comprises a piston 26 having a generally cylindrically shaped body portion 28 and a circumferentially extending flange portion 30 formed about the bottom of the piston 28. As best seen by referring to FIG. 2, and as indicated by the phantom lines in this Figure, piston 26 is telescopically movable within aperture 15 between a first at rest position shown in the solid lines in FIG. 2 and a second depressed position indicated by the phantom lines in FIG. 2. It is to be observed that flange portion 30 is of a diameter slightly larger than the diameter of aperture 15 so that when the piston 26 is in its at rest position shown in FIG. 2, the flange is in engagement with the inner wall of the hemispherical scoop 14.

As used hereinafter, "upper" and "lower" refer to portions of the piston when the device of the invention is in a position such as is shown in FIG. 2 open scoop facing downward relative the earth.

Figure 3:
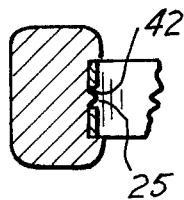
FIG. 3 is a cross-sectional view taken along lines 3—3 of FIG. 1.

Also forming a part of the ejection means of the invention is a connector element 32 having a first end 34 which is connected to a top wall 36 of the piston 26 by means of a threaded fastener 38. The connector element 32 which, in the form of the invention shown in the drawings, is provided in the form of an elongated, flat leaf spring constructed of a spring steel material, also includes a second end portion generally designated by the numeral 40. Second end portion 40 is provided with an aperture 42 which closely receives upstanding protuberance 24 in the manner illustrated in FIGS. 1 and 3. Second end portion 40 of the connector element includes a rearward extremity portion 44 which is closely receivable within the space defined between the diametrically opposed ears 24 and the base wall 20 of the channel formed in the handle 16. It is apparent from the drawings that when the second portion 40 of the connector element is in position within the channel formed in the handle with the protuberance 24 extending upwardly into aperture 42. The connector element, or spring member, is locked against sliding movement within the channel 18. It is also apparent from the drawings that with the connector element positioned in the channel 18 in the manner shown in FIG. 2, the rearward extremity 44 of the connector element is locked against upward movement in a direction away from the base wall 18 of the cahnnel. The importance of this double locking feature provided by the ears 24 and the protuberance 25 will soon become apparent.

Connector element 32 also includes biasing means for biasing the piston assembly toward its at rest position wherein flange portion 30 of the piston assemblage is in pressural engagement with the inner wall of the scoop 14 in the manner shown by the solid lines of FIG. 2. In the form of the invention shown in the drawings, this biasing means is provided in the form of an intermediate resiliently deformable spring-like section 48 formed intermediate the first and second end portions of the connector element 32. Referring to FIG. 2, the intermediate portion 48 of the leaf spring member 32 is tensioned so that when end portion 44 is held captive against upward movement out of channel 18 it will exert an upwardly force on the piston 26 in the direction indicated by the arrow 50. Because the extremity 44 of the spring or connector member cannot move upwardly because of the resistance offered by the ears 24 and because the spring element cannot move longitudinally within the channel 18 due to the resistance offered by the upstanding protuberance 25, the ejection mechanism of the invention will be securely maintained in the position shown in the drawings so long as the connector element, or spring, 32 remains intact. Should the spring member fail, as, for example, in the intermediate section 48, it is apparent that the piston can be removed from the device by withdrawing it through the aperture 15 formed in the scoop. Similarly, the end portion 40 can be removed from the channel 18 by simply lifting the member upwardly to a position wherein the aperture 42 clears the upstanding protuberance 25. With this unique construction, a new ejection mechanism can quickly and easily be reinstalled into the handle and scoop portion of the device by simply inserting the connector, or spring, member through the aperture formed in the scoop portion of the device and then by bending the first end portion of the spring sufficiently to permit extremity 44 to slide beneath the inwardly extending ears 24 and simultaneously permitting the protuberance 25 to enter the aperture 42 formed in the spring member.

Due to the unique configuration of the improved device as described in the preceding paragraphs, when the ejection mechanism fails due to material fatigue, no longer must the entire device be discarded. Rather, a new ejection mechanism embodying a new leaf spring can quickly and easily be reassembled into the tool by unskilled persons without the need of any kinds of tools or without the use of any kinds of fasteners.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An ice cream scoop comprising:
   (a) a generally hemispherically shaped hollow scoop having a centrally disposed aperture;
   (b) a handle connected to said scoop, said handle having:
      (i) an elongated channel formed therein, said channel including a base wall; and
      (ii) locking means extending over said elongated channel in a spaced apart relationship with said base wall of said channel for forming an enclosure having a top wall and a bottom wall;
   (c) ejection means removably connected to said handle for ejecting ice cream contained within said scoop, said ejection means comprising:
      (i) a piston having a generally cylindrically shaped body telescopically receivable within said aperture formed in said hollow scoop and a circumferentially extending flange portion connected to said cylindrically shaped body; and
      (ii) a connector element having a first end removably connected to said piston, a second end portion receivable within said enclosure of said handle defined by said base wall and said locking means, and means for biasing said flange portion of said piston into engagement with said scoop when said second end portion of said connector element is received within said closure of said handle.

2. An ice cream scoop as defined in claim 1 in which said base wall of said channel includes an upstanding protuberance and in which said second end portion of said connector element is provided with an aperture closely receivable over said protuberance.

3. An ice cream scoop as defined in claim 2 in which said channel has transversely spaced side walls and in which said locking means comprises first and second generally planar, ear-like locking members extending inwardly from said side walls of said channel in a spaced relationship with said base wall.

4. An ice cream scoop as defined in claim 3 in which said first end of said connector element includes a generally planar segment, in which said second end portion of said connector element is generally planar and in which said connector element includes a resiliently deformable spring-like section disposed intermediate said first end and said second end portion of said spring-like section, said spring-like section comprising said means for biasing said flange portion of said piston into engagement with said scoop.

5. An ice cream scoop comprising:
(a) a handle having an elongated recessed portion, said recessed portion including a base wall and transversely spaced apart side walls extending upwardly from said base wall, said handle having first and second transversely spaced ears extending inwardly from said side walls and extending over said base wall in a spaced apart relationship therewith, to define an enclosure having top and bottom walls said handle also having a protuberance extending upwardly from said base wall;
(b) a dished out scoop portion connected to said handle, said scoop portion having a centrally disposed aperture therethrough; and
(c) ejection means removably connected to said handle for ejecting ice cream contained within said scoop portion, said ejection means including:
(i) a piston comprising a generally cylindrically shaped body portion having an upper wall and a circumferentially extending lower flange, said flange having a diameter greater than the diameter of said aperture, said body portion being telescopically movable within said aperture; and
(ii) a connector member constructed of a yieldably resilient spring material having a first end connected to said upper wall of said body portion, a first intermediate portion receivable with said recessed portion of said handle and having a central aperture closely receivable over said protuberance formed on said handle and a second intermediate biasing portion for yieldably biasing said first end upwardly when said first intermediate portion is at least partially received within said enclosure defined by said base wall of said channel and said first and second ears.

6. In an ice cream scoop of the character having a handle provided with an elongated recessed portion, including a base wall and transversely spaced apart side walls extending upwardly from said base wall, a dished out scoop portion connected to said handle, said scoop portion having a centrally disposed aperture therethrough, an ejection mechanism removably connected to said handle for ejecting ice cream contained within said scoop portion, said ejection mechanism including a piston comprising a generally cylindrically shaped body portion having an upper wall and a circumferentially extending lower flange, said flange having a diameter greater than the diameter of said aperture, said body portion being telescopically movable within said aperture, and a connector member constructed of a yieldably resilient spring material having a first end connected to said upper wall of said body portion, a first intermediate portion receivable with said recessed portion of said handle and a second intermediate biasing portion for yieldably biasing said first end upwardly when said first intermediate portion is secured against upward movement relative to said base wall, the improvement comprising first and second transversely spaced ears extending inwardly from said side walls of said recessed portion and extending over said base wall in a spaced apart relationship therewith to define an enclosure for slidably receiving at least a part of said first intermediate portion of said connector member whereby said intermediate portion is secured against upward movement relative to said base wall.

7. An ice cream scoop as defined in claim 6 in which the improvement further comprises an upstanding protuberance formed on said base wall of said recessed portion and in which said first intermediate portion of said connector member is provided with an aperture for closely receiving said protuberance.

* * * * *